United States Patent [19]

Kondo et al.

[11] Patent Number: 5,731,849
[45] Date of Patent: Mar. 24, 1998

[54] MOVEMENT VECTOR DETECTING APPARATUS

[75] Inventors: Toshiaki Kondo, Fujisawa; Masayoshi Sekine, Tokyo, both of Japan

[73] Assignee: Canon Kabushiki Kaisha, Tokyo, Japan

[21] Appl. No.: 29,550

[22] Filed: Mar. 11, 1993

[30] Foreign Application Priority Data

Mar. 13, 1992 [JP] Japan ........................... 4-088337
Apr. 6, 1992 [JP] Japan ........................... 4-112442

[51] Int. Cl.$^6$ ........................... H04N 5/232; H04N 7/32
[52] U.S. Cl. ........................... 348/699; 348/416; 348/413; 348/402; 348/407
[58] Field of Search ........................... 348/416, 699, 348/208, 407, 413, 402, 218, 219, 220, 390; H04N 5/232, 5/95, 5/217, 7/32

[56] References Cited

U.S. PATENT DOCUMENTS

| 3,890,462 | 6/1975 | Limb et al. ........................ 158/6.8 |
| 5,012,270 | 4/1991 | Sekine ............................. 248/208 |
| 5,019,901 | 5/1991 | Uomori et al. ..................... 248/416 |
| 5,036,393 | 7/1991 | Samad et al. ...................... 348/699 |
| 5,151,784 | 9/1992 | Lavagetto et al. .................. 348/416 |
| 5,157,732 | 10/1992 | Ishii et al. ...................... 348/208 |
| 5,177,608 | 1/1993 | Ohki et al. ....................... 348/416 |
| 5,189,518 | 2/1993 | Nishida ........................... 348/208 |
| 5,237,405 | 8/1993 | Egusa et al. ...................... 248/208 |
| 5,291,300 | 3/1994 | Ueda .............................. 348/208 |

FOREIGN PATENT DOCUMENTS

| 449283 | 10/1991 | European Pat. Off. ........ H04N 5/217 |
| 454481 | 10/1991 | European Pat. Off. ......... H04N 5/14 |
| 481421 | 4/1992 | European Pat. Off. ........ G06F 15/70 |
| 60-46878 | 10/1985 | Japan ....................... H04N 7/18 |
| 61-248681 | 11/1986 | Japan ...................... H04N 5/232 |
| 2-117276 | 5/1990 | Japan ...................... H04N 5/232 |

OTHER PUBLICATIONS

Horn et al., "Determining Optical Flow", *Artificial Intelligence*, 17, Aug. 1981, pp. 185–203.

*Primary Examiner*—Howard W. Britton
*Assistant Examiner*—Vu Le
*Attorney, Agent, or Firm*—Fitzpatrick, Cella, Harper & Scinto

[57] ABSTRACT

A movement vector detecting apparatus comprising: a movement vector detecting circuit for dividing an input image into a plurality of blocks and for detecting a movement vector every block; and a movement vector calculating circuit for extracting areas which perform the same movement from the movement vectors from the movement vector detecting circuit and for calculating movement vector values in such areas by executing a weight averaging process according to position information which occupies in the area of each of the blocks. A video camera having such a movement vector detecting apparatus is provided.

45 Claims, 16 Drawing Sheets

(WEIGHT COEFFICIENT DISTRIBUTION)

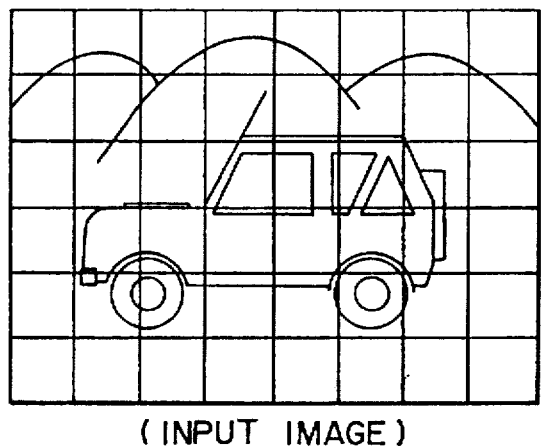
(INPUT IMAGE)
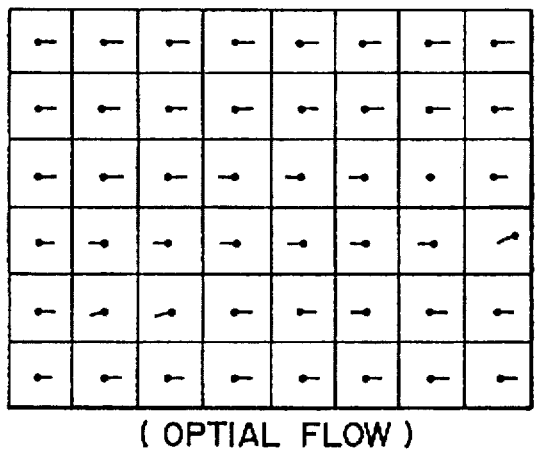
(OPTICAL FLOW)
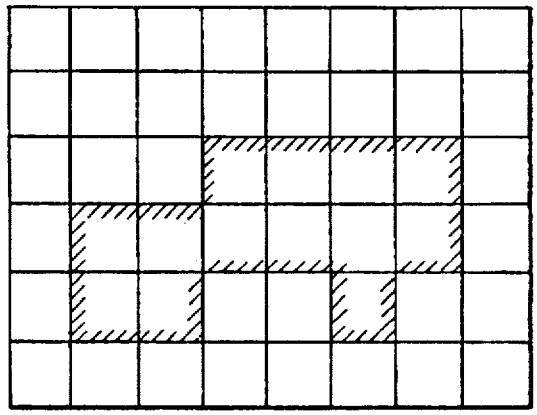
(VIBRATIONPROOF AREA DECISION)
FIG.2A
FIG.2B
FIG.2C

FIG.3

| o | o | o | o | o | o | o | o |
|---|---|---|---|---|---|---|---|
| o | o | o | o | o | o | o | o |
| o | o | o | 1 | 1 | 1 | 1 | o |
| o | 1 | 1 | 1 | 1 | 1 | 1 | o |
| o | 1 | 1 | o | o | 1 | o | o |
| o | o | o | o | o | o | o | o |

(VIBRATIONPROOF AREA MAP)

FIG.4

| 0.5 | 1 | 0.5 |
|---|---|---|
| 1 | 1 | 1 |
| 0.5 | 1 | 0.5 |

FIG.5

| 0.1 | 0.5 | 1 | 0.5 | 0.1 |
|-----|-----|---|-----|-----|
| 0.5 | 1   | 2 | 1   | 0.5 |
| 1   | 2   | 2 | 2   | 1   |
| 0.5 | 1   | 2 | 1   | 0.5 |
| 0.1 | 0.5 | 1 | 0.5 | 0.1 |

FIG.6

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 4 | 5 | 5 | 3.5 | 0 |
| 0 | 3.5 | 5 | 5 | 5.5 | 6 | 4 | 0 |
| 0 | 3.5 | 4 | 0 | 0 | 3 | 0 | 0 |
| 0 | 0 | 0 | 0 | 0 | 0 | 0 | 0 |

( WEIGHT COEFFICIENT DISTRIBUTION )

FIG.7

| 3.5 | 5 | 5 | 5 | 5 | 5 | 5 | 3.5 |
|---|---|---|---|---|---|---|---|
| 5 | 7 | 7 | 7 | 7 | 7 | 7 | 5 |
| 5 | 7 | 7 | 7 | 7 | 7 | 7 | 5 |
| 5 | 7 | 7 | 7 | 7 | 7 | 7 | 5 |
| 5 | 7 | 7 | 7 | 7 | 7 | 7 | 5 |
| 35 | 5 | 5 | 5 | 5 | 5 | 5 | 3.5 |

( WEIGHT COEFFICIENT ( AT MAXIMUM ) DISTRIBUTION )

FIG.9

| 0.5 | 0.5 | 0.5 |
|---|---|---|
| 0.5 | 1 | 0.5 |
| 0.5 | 0.5 | 0.5 |

FIG.10

| 0 | 0 | 0 | 0 | 0 | 0 | 0 | 0 |
|---|---|---|---|---|---|---|---|
| 0 | 0 | 0.5 | 1 | 1.5 | 1.5 | 1 | 0.5 |
| 0.5 | 1 | 2 | 3 | 3.5 | 3.5 | 2.5 | 1 |
| 1 | 2.5 | 3.5 | 3.5 | 3.5 | 4 | 3 | 1 |
| 1 | 2.5 | 3 | 2 | 2 | 2.5 | 1.5 | 0.5 |
| 0.5 | 1 | 1 | 0.5 | 0.5 | 0.5 | 0.5 | 0 |

( WEIGHT COEFFICIENT DISTRIBUTION )

(1) VIBRATION COMPONENT
(2) TRACKING OPERATION + VIBRATION
(3) NOISE

VIBRATIONPROOF AREA

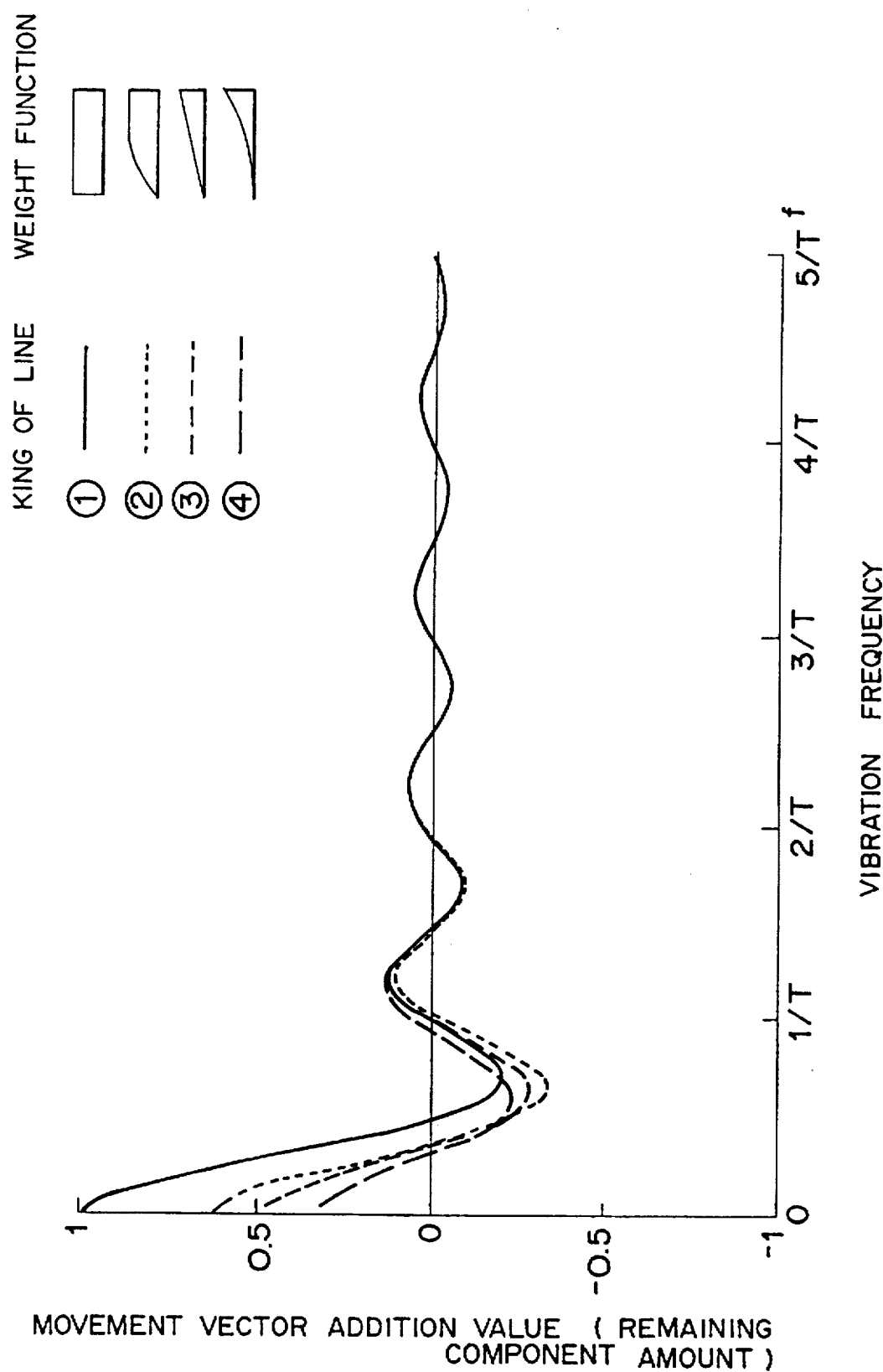

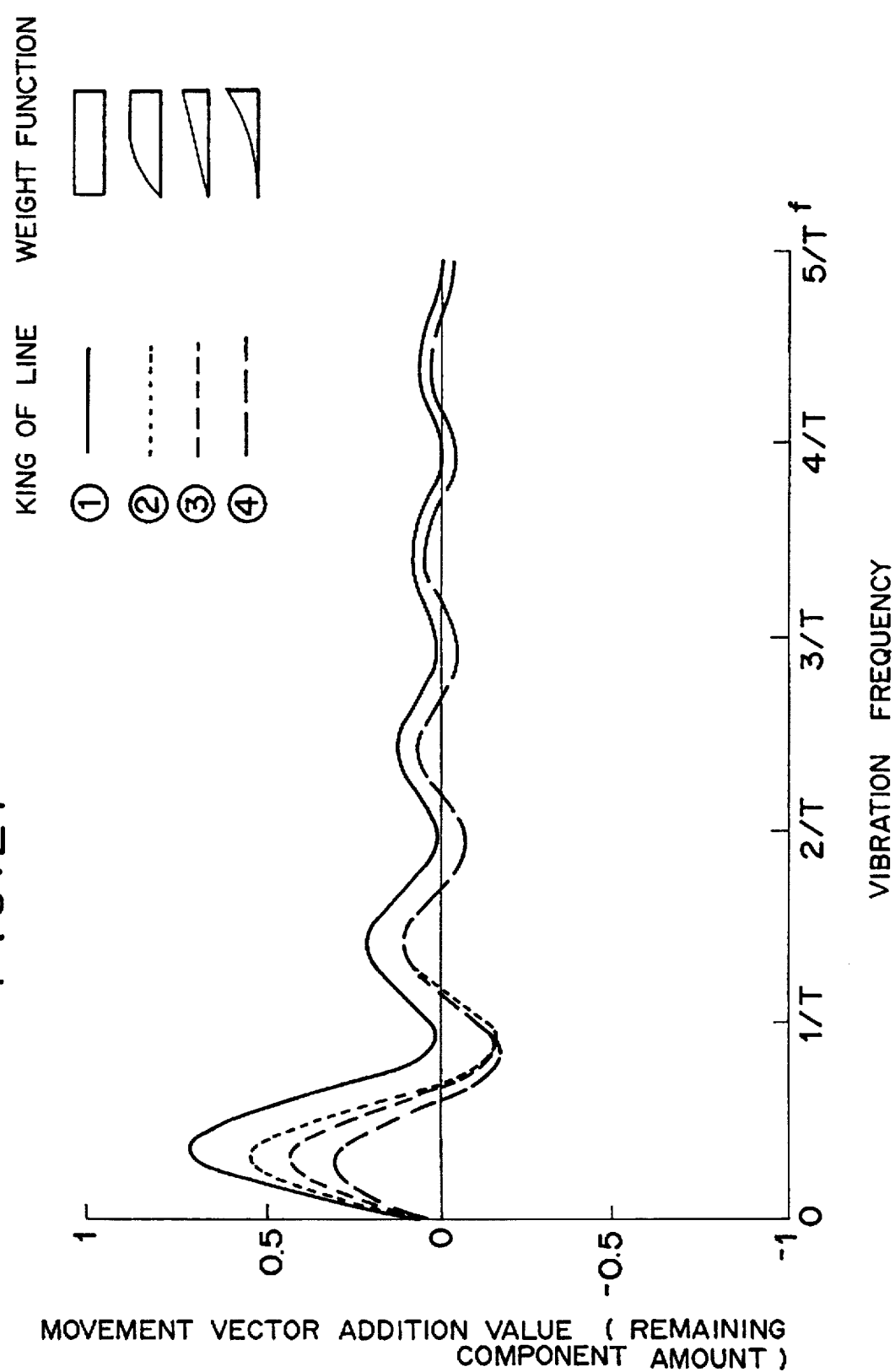

MOVEMENT VECTOR DETECTING APPARATUS

BACKGROUND OF THE INVENTION

1. Field of the Invention

The present invention relates to the improvement of a movement vector detecting apparatus which is provided for an encoding apparatus or an image vibration correcting apparatus of a moving image signal.

2. Related Background Art

Hitherto, as a movement vector detecting method which is necessary for an encoding apparatus or an image vibration correcting apparatus of an image, there has been known a time space gradient method, a correlation method based on the correlation arithmetic operation, or a block matching method as disclosed in U.S. Pat. No. 3,890,462, JP-B-60-46878, or the like. The time space gradient method is described in detail in B. K. P. Horn et al., "Artificial Intelligence 17", pages 185 to 203, 1981. The matching arithmetic operation is described in detail in Morio Ogami et al., "Information Processing", Vol. 17, No. 7, pages 634 to 640, July, 1976.

The time space gradient method is a method whereby a movement amount of an image is expressed by d/Δ from a luminance difference d between frames (or fields) and a luminance difference Δ between pixels in a picture plane. According to this method, the luminance difference d between frames (or fields) is normalized by a signal Δ by using a nature such that a signal which is obtained from a camera corresponds to a time average of a field period and, as a movement amount of the image is large, an edge becomes dull and the luminance difference Δ between pixels decreases.

On the other hand, according to the block matching method (also called a template matching method), an input image signal is divided into blocks of a proper size (for instance, 8 pixels×8 lines), a difference between the present pixel and the pixel in a predetermined range of the preceding frame (or field) is calculated on a block unit basis, and the block of the preceding frame (or field) in which the sum of the absolute value of such a difference becomes minimum is searched. A relative deviation of the relevent block indicates a movement vector of such a block.

According to the above conventional methods, however, when there are a plurality of different movements in the picture plane, only movement vector of a low reliability can be detected from the block which lies over the boundary of such different movements because of a mismatching of the corresponding point due to the appearance or hiding of an object to be photographed or an influence by the different movements of the other objects to be photographed. There is a problem such that an encoding precision of the encoding apparatus or a correction precision of the image vibration correcting apparatus remarkably deteriorates due to the erroneous movement vectors which are detected from such a block.

SUMMARY OF THE INVENTION

It is the first object of the present invention to provide a movement vector detecting apparatus which can improve a detection precision of a movement vector in consideration of the above problems.

To accomplish the above object, according to a preferred embodiment of the present invention, there is disclosed a movement vector detecting apparatus comprising: movement vector detecting means for dividing an input image into a plurality of blocks and for detecting a movement vector every block; and movement vector calculating means for extracting areas in which the same motion is performed from the movement vectors from the movement vector detecting means and for calculating movement vector values in such areas by performing a weight averaging process according to position information which occupies in the area of each of the blocks or movement vector calculating means for extracting areas in which the same motion is performed from the movement vectors from the movement vector detecting means and for calculating movement vector values in such areas by executing a weight averaging process according to position information which occupies in the input image of each of the blocks.

The second object of the invention is to provide a video camera with a vibrationproof apparatus which has the above movement vector detection apparatus and can detect and correct a vibration at a high precision.

According to a preferred embodiment of the present invention, there is disclosed a video camera in which movement vector calculating means is constructed so as to calculate a movement vector value by performing a weighting process according to the position information which occupies in areas which perform the same motion of each block or position information which occupies in an input image of each block, namely, according to a spatial or time-dependent adjacency degree of each block, thereby enabling a high accurate movement vector detection to be performed.

The third object of the invention is to provide a vibrationproof apparatus which detects a vibration by detecting a movement vector of an image, wherein by always optimizing a vibrationproof area to execute the vibrationproof, the vibrationproof operation can be performed at a high precision and a high reliability.

To accomplish the above objects, according to a preferred embodiment of the invention, there is disclosed a vibrationproof apparatus comprising: movement vector detecting means for detecting a movement vector every area which is obtained by dividing an image into a plurality of areas; vibration amount detecting means for detecting a vibration amount on the basis of movement vector information of an area corresponding to an indicated vibrationproof area which is obtained from the movement vector detecting means; correcting means for correcting a vibration; and driving means for correcting the vibration by driving the correcting means in accordance with the information from the vibration amount detecting means, wherein the apparatus further comprises boundary detecting means for detecting a boundary in the image and vibrationproof area deciding means for deciding the area to be subjected to a vibrationproof on the basis of the boundary information from the boundary detecting means and the information from the movement vector detecting means and for instruction the vibrationproof area to the vibration amount detecting means.

According to another preferred embodiment of the invention, there is disclosed a vibrationproof apparatus comprising: movement vector detecting means for detecting a movement vector every area which is obtained by dividing an image into a plurality of areas; vibration amount detecting means for detecting a vibration amount on the basis of movement vector information of an area corresponding to an indicated vibrationproof area which is obtained from the movement vector detecting means; correcting means for correcting a vibration; and driving means for correcting the vibration by driving the correcting means in accordance with the information from the vibration amount detecting means, wherein the apparatus further comprises vibrationproof area deciding means for applying different weights to the information from the movement vector detecting means, for adding the weighted information for a predetermined time, for deciding the area to be subjected to the vibrationproof on the basis of each addition value, and for instructing the vibrationproof area to the vibration amount detecting means.

Further another object of the invention is to provide a video camera having the above vibrationproof apparatus.

The above and other objects and features of the present invention will become apparent from the following detailed description and the appended claims with reference to the accompanying drawings.

BRIEF DESCRIPTION OF THE DRAWINGS

FIGS. 2A to 2C are diagrams showing a flow from the input of an image signal to the judgment of a vibrationproof area;

FIG. 3 is a diagram showing a binary map indicative of a vibrationproof area in the first embodiment of the invention;

FIG. 4 is a diagram showing an example of a convolution mask which is put on the vibrationproof area in FIG. 3;

FIG. 5 is a diagram showing another example of a convolution mask which is put on the vibrationproof area in FIG. 3;

FIG. 6 is a weight coefficient distribution diagram showing the reliability in the vibrationproof area in the first embodiment of the invention;

FIG. 7 is a weight coefficient distribution diagram when a whole picture plane becomes a vibrationproof area according to the second embodiment of the present invention;

FIG. 9 is a diagram showing an example of a convolution mask which is put on a vibrationproof area according to the third embodiment of the invention;

FIG. 10 is a weight coefficient distribution diagram when the mask of FIG. 9 has been convoluted to the vibrationproof area map of FIG. 3;

FIG. 20 is a diagram showing a magnitude of a remaining component when a vibration state has been modeled by a cosine curve and added for a predetermined time; and FIG. 21 is a diagram showing a magnitude of a remaining component when a vibration state has been modeled by a sine curve and added for a predetermined time.

DETAILED DESCRIPTION OF THE PREFERRED EMBODIMENTS

The present invention will be described in detail hereinbelow on the basis of embodiments with reference to the drawings.

Figure 1:
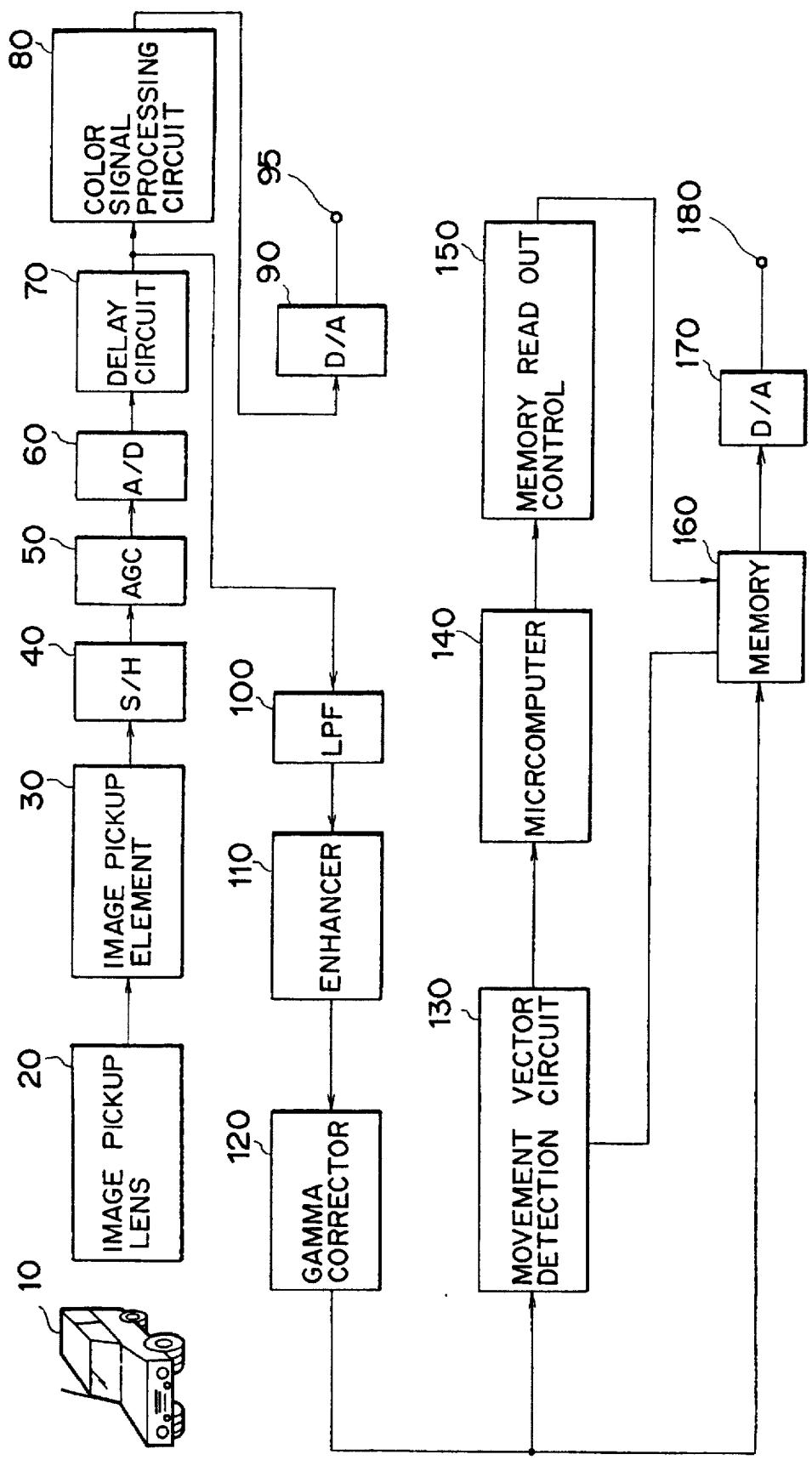
FIG. 1 is a block diagram showing a construction of a video camera having therein an image vibration correcting apparatus to which the first embodiment of the present invention is applied.

FIG. 1 is a block diagram showing a construction of a video camera having therein an image vibration correcting apparatus to which the first embodiment according to the invention has been applied.

In FIG. 1, reference numeral 10 denotes an object to be photographed; 20 an image pickup lens; 30 an image pickup element comprising, for example, a two-dimensional CCD; 40 a sample and hold (S/H) circuit to read out an output signal from the image pickup element 30 such as a two-dimensional CCD; 50 an automatic gain control (AGC) circuit to keep a signal level constant; 60 an analog/digital (A/D) converter; 70 a delay circuit to delay a color difference line-sequential signal from the image pickup element 30 such as a two-dimensional CCD by only a period of time of two horizontal scans; 80 a color signal processing circuit; 90 a digital/analog (D/A) converter to convert a color signal into a digital signal; and 95 a color signal output terminal.

Reference numeral 100 denotes a low pass filter (LPF) to eliminate a color signal component which is mixed into a luminance signal; 110 an enhancer to enhance a high frequency component in the luminance signal; 120 a gamma corrector; 130 a movement vector detection circuit; 140 a microcomputer to judge the reliability of each block which is obtained by dividing a picture plane to detect a movement vector into a plurality of blocks; 150 a memory read-out control circuit; 160 a memory to store an image of a field or a frame; 170 a D/A converter to convert the luminance signal into the digital signal; and 180 a luminance signal output terminal.

The operation of the video camera with the above construction will now be described.

The object 10 is projected onto the image pickup element 30 by the image pickup lens 20 and is photoelectrically converted into an electric signal by the image pickup element. The S/H circuit 40 samples and reads out an output signal of the image pickup element 30. The AGC circuit 50 automatically controls a gain of the output signal of the S/H circuit. The A/D converter 60 A/D converts an output signal of the AGC circuit 50. The delay circuit 70 of the two-horizontal scan period of time separates the color difference line-sequential signal from the image pickup element 30 into a "1H" delay signal and a "0H+2H" delay signal and supplies to a luminance signal processing section (circuit after the LPF 100) and the color signal processing circuit 80.

The color signal processing circuit 80 produces a color signal. The color signal is converted into the analog signal by the D/A converter 90 and is outputted from the color signal output terminal 95.

On the other hand, the signal sent to the luminance signal processing section is first supplied to the LPF 100. The LPF 100 eliminates a carrier component from the color difference sequential signal and separates the luminance signal. The enhancer 110 executes a process to enhance a high frequency component such as an edge of the object or the like in order to improve a picture quality. Ordinarily, a secondary differentiation of a video signal is added to an original signal. The gamma corrector 120 prevents the saturation in a highlight portion and widens a dynamic range. The movement vector detection circuit 130 can be constructed by a circuit based on the foregoing time space gradient method or a circuit based on the foregoing matching arithmetic operation. In the embodiment, however, it is necessary to use a detecting method which can execute processes in a real-time manner. The memory 160 is a delay circuit to delay the luminance signal by a predetermined time (in the embodiment, one field time). The memory 160 stores the luminance signal which is preceding by one field and enables an arithmetic operation based on the time space gradient method or a correlation arithmetic operation with the present field to be performed. The microcomputer 140 first extracts the block which is a target for correction and generates a movement vector due to a vibration from the distribution (optical flow) of the movement vectors which are detected by the movement vector detection circuit 130. The microcomputer 140, further, executes a weighting process according to a degree of surrounding state of the relevant block to the output signal from such a block and calculates a movement amount of the image at the moment. The memory read-out control circuit 150 controls the read-out position of the memory 160 so as to set off (or correct) the final movement vector calculated by the microcomputer 140. The luminance signal read out from the memory 160 is converted into the analog signal by the D/A converter 170 and is outputted from the luminance signal output terminal 180.

A method of evaluating the reliability of the movement vector which is executed in the microcomputer 140 will now be described with reference to FIGS. 2 to 6.

FIGS. 2A to 2C are diagrams showing a flow from the input of the image signal to the judgment of an area (hereinafter, referred to as a vibrationproof area) to be subjected to a vibrationproof at that moment.

FIG. 2A shows an input image which is divided into (8×6) blocks. FIG. 2B shows the result of the detection of the movement vector performed every block. A distribution diagram of such movement vectors is generally called an optical flow diagram. In FIG. 2B, it will be undersood that areas which largely perform two different motions exists in the central portion and a peripheral portion of the picture plane. FIG. 2C shows the result in which the vibrationproof area has been extracted from the optical flow diagram.

As a method of extracting the vibrationproof area from the movement vectors, there is a time direction adding method of movement vectors of each block disclosed in Japanese Patent Application No. 63-269554 which has already been filed or the like.

FIG. 3 shows a binary vibrationproof area map (effective area) in which "1 value" is allocated to the extracted areas and "0 value" is allocated to the area out of the target.

Generally, the vibrationproof area map is multiplied to the detected movement vectors and the effective area is extracted and the movement vectors in the effective area are simple averaged by a uniform weight, thereby obtaining a movement amount of the image.

FIG. 4 shows an example of a convolution mask which is put on the vibrationproof area map as shown in FIG. 3.

The mask of FIG. 4 denotes that in the case where blocks adjacent to the present target blocks in the vertical and lateral directions exist, point 1 is given to the present target blocks, respectively. When the blocks adjacent to the present target blocks in the oblique directions exist, point 0.5 is given to the present target blocks. Due to this, the point is raised as the number of other blocks which surround the present target blocks is large. The reason why the point in the oblique direction is low is based on characteristics such that the image signal generally has a small amount of oblique component. The convolution is executed for only the effective blocks (blocks in which the value "1" has been inserted) as a target. Or, the vibrationproof area map is subjected to the AND arithmetic operation to the result in which the convolution has been performed to the whole picture plane, and the value of the non-vibrationproof area (invalid area) is held to "0".

FIG. 5 shows an example in case of expanding the convolution mask from "3×3" shown in FIG. 4 to "5×5".

A size of convolution mask or weight coefficients in the mask (namely, a method of giving the point) can be also switched in accordance with image pickup conditions.

FIG. 6 shows the result in the case where the mask of FIG. 4 has been convoluted to the effective area of the vibrationproof area map of FIG. 3.

Coefficient values shown in FIG. 6 show the reliabilities of the movement vectors which are detected from the relevant block. It is sufficient to execute an averaging process of the movement vectors in accordance with the weights.

The read-out position of the image from the memory is decided by using the movement vectors obtained by the above processes and the image in which the unpleasant vibration component has been corrected is outputted from a luminance signal output terminal 180.

(Second embodiment)

According to the above first embodiment, the weight averaging process of the movement vectors has been executed to the effective area of the vibrationproof area map in accordance with the result in which a certain mask has been convoluted. In the second embodiment, however, the reliability of the movement vector itself obtained in the first embodiment is newly evaluated by using the total number of weight coefficients obtained as a result of the convolution of a certain mask, namely, by using the total number of points. The second embodiment can be also used together with the first embodiment.

FIG. 7 shows the result in which the convolution mask of FIG. 4 was put in the case where it is determined that all of the "8×6" blocks in the picture plane are effective.

In this case, the total number of all weight coefficients in FIG. 7 is equal to 282 and is the upper limit of the such a total number. Since the reliability of the movement vectors which are detected from the relevant area is high as the area of the vibrationproof area is large, the reliability of the movement vector can be newly evaluated from the magnitude of the total number of weight coefficients.

Figure 8:
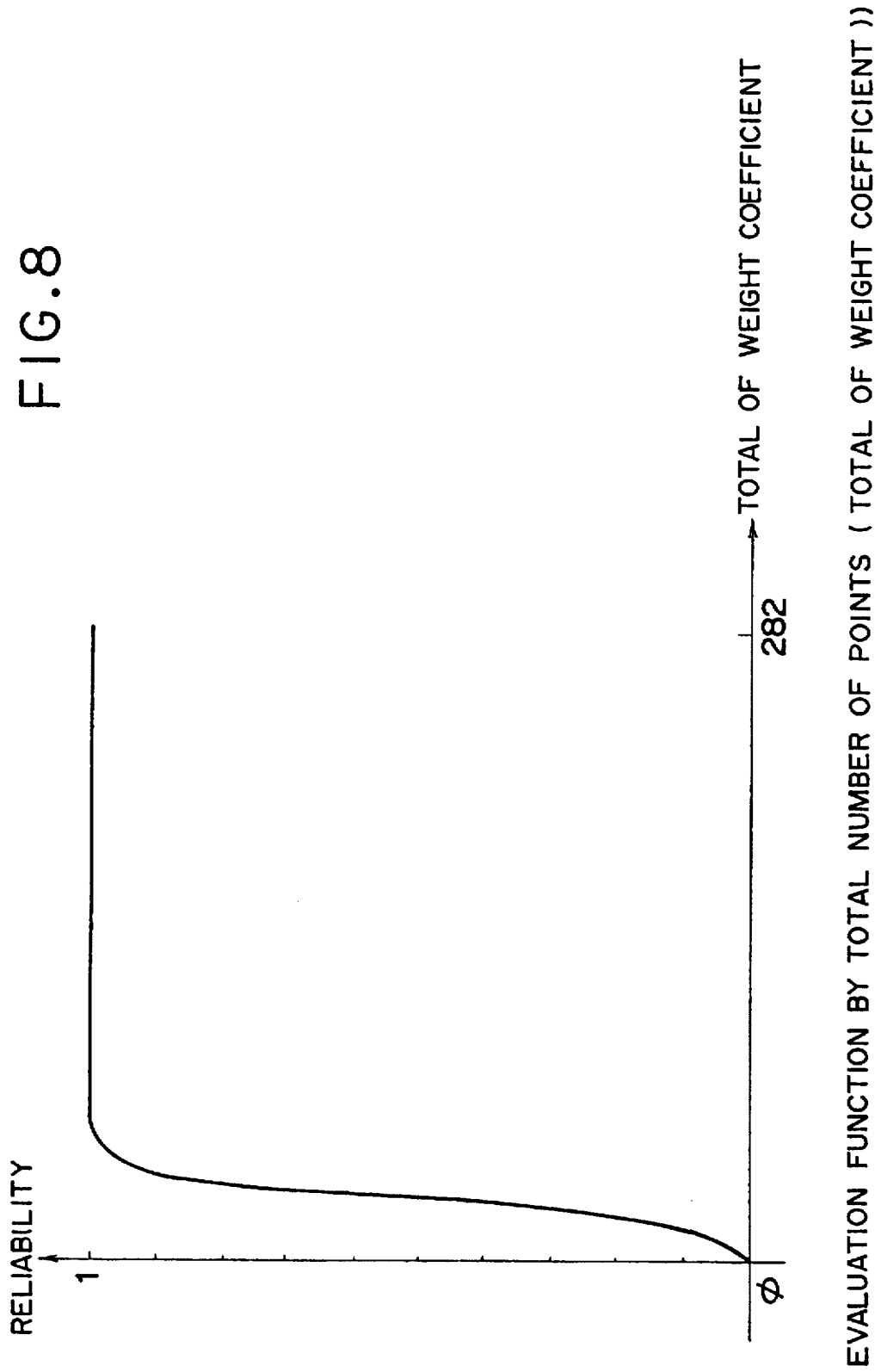
FIG. 8 is a diagram showing a reliability evaluation function according to the total number of weight coefficients in the second embodiment of the invention.

FIG. 8 shows a reliability evaluation function according to the total number of weight coefficients.

When the total number of points is small, the extracted area is small or the extracted areas separately exist. In any of the above two cases, since a possibility such that the movement vectors were erroneously detected is high, a small coefficient less than "1" is multiplied, thereby suppressing an influence on the subsequent processes. Now, assuming that the number of blocks in the picture plane is equal to "M×N", the distribution of the points is expressed as follows.

0≦(the total number of points)≦7 MN−4M−4N+2

The above processes are executed by the microcomputer 140 in FIG. 1.

(Third embodiment)

In the above first and second embodiments, the reliability has been evaluated by using the information of the spatial arrangement of the target blocks as a clue. According to the third embodiment, however, such a concept is expanded in a time base direction.

Generally, a correlation in the time direction of a moving image is high. For instance, when the object is traced and photographed, the position of the object which occupies in the picture plane is strongly restricted at the position locating in the preceding picture plane (preceding field) and a possibility such that the object appears every field without a correlation is extremely small. Namely, a possibility such that the effective area in the present picture plane appears at a position near the area which has been regarded as an effective area in the preceding picture plane is high. Therefore, the area which has been judged as an effective area in the present picture plane is set to the peak center and a map having a gentle weight coefficient distribution is formed and the AND is got between such a map and the vibrationproof area map which will be obtained in the next picture plane. Thus, it is possible to evaluate the reliability utilizing the correlation in the time direction of the positions in the picture plane of a certain area.

An embodying procedure will now be described with reference to FIGS. 9 and 10.

FIG. 9 shows a convolution mask which is put on the vibrationproof area map obtained in the present picture plane. Since it is considered that a deviation of the position of an object between images occurs at the same probability in every direction of 360°, the weight coefficient distribution of the mask is also isotropic.

FIG. 10 shows the result in which the mask shown in FIG. 9 has been convoluted to the vibrationproof area map shown in FIG. 3.

By executing an AND arithmetic operation between the weight coefficient distribution shown in FIG. 10 and the vibrationproof area map which will be obtained in the next picture plane, the reliability of each block can be easily evaluated.

The above processes are executed by the microcomputer 140 in FIG. 1.

According to the foregoing embodiment, the reliability of the movement vector which is detected is evaluated by the spatial or time-dependent adjacency degree (approach degree) of each block and the weighting process according to the reliability evaluation is executed to the movement vector. Therefore, it is possible to improve the precision of the moving image encoding apparatus or image vibration correcting apparatus whose precision has remarkably been deteriorated by the movement vectors of low reliabilities which are detected from the block including a boundary portion in which different motions inherent exist.

According to the above embodiment as described above, the apparatus comprises: the movement vector detecting means for dividing an input image into a plurality of blocks and for detecting movement vectors every block; and the movement vector calculating means for extracting the areas in which the same motion is performed from the movement vectors from the movement vector detecting means and for calculating the movement vector values in such areas by executing the weight averaging process according to the position information which occupies in the areas of each of the blocks or the movement vector calculating means for extracting the areas in which the same motion is performed from the movement vectors from the movement vector detecting means and for calculating the movement vector values in such areas by executing the weight averaging process according to the position information which occupies in the input image of each block, wherein the movement vector value is calculated by executing the weighting process according to the position information which occupies in the areas in which the same motion is performed of each block or the position information which occupies in the input image of each block, namely, according to the spatial or time-dependent adjacency degree of each block.

Consequently, the detection precision of the movement vector can be improved.

The fourth to sixth embodiments of the present invention will now be described.

Those embodiments are based as a prerequisite on the vibrationproof apparatus in which movement vector information of the area corresponding to the designated vibrationproof area on the picture plane is detected and the vibration amount is detected on the basis of the movement vector information and the vibration correcting means is made operative to thereby correct the vibration. The deciding process of the vibrationproof area to detect the vibration is optimized.

Prior to explaining those embodiments, the background of such a kind of vibrationproof apparatus will be first described.

In a photographing optical apparatus such as camera, video camera, electronic camera, or the like, the camera vibration makes it hard to see the image and becomes a cause of every malfunction irrespective of a measuring instrument for an industrial use or an apparatus for a public use. Particularly, in the photographing during the walk, the photographing from a moving vehicle, or the photographing at a location where there are much vibrations, the vibration of the picture plane easily occurs. Therefore, various kinds of methods of correcting the vibration of the picture plane have conventionally been proposed.

For instance, according to the vibrationproof camera disclosed in JP-A-61-248681, an incident image is converted into an electric signal by an image pickup system comprising a lens system and a photoelectric converting element. The electric signal is further subjected to predetermined signal processes by the circuit at the next stage and is converted into the television image signal and supplied to a monitor apparatus. The TV image signal is also supplied to an image vibration detecting circuit. By getting a correlation between two picture planes which is away from each other by a predetermined time interval, the magnitude and direction of the image vibration are detected. On the basis of the result of the detection, the lens system is driven and controlled in such a direction as to set off the image vibration.

On the other hand, according to "Picture Plane Vibration Correcting Apparatus", The Japan Society of Television, Technical Report Vol. 11, No. 3, pages 43 to 48, PPOE, 87-12, May, 1987, between two picture planes which are away from each other by a predetermined time interval, the correlation is obtained every small area (hereinafter, referred to as block) which is obtained by equivalently dividing the picture plane into 140 small areas, thereby detecting the magnitude and direction of the image vibration with respect to the whole picture plane. The results of the detection are subjected to a decision by majority, namely, the area of the maximum area in which the detected movement vectors are preferably arranged is set to a target for the vibrationproof, thereby judging the magnitude and direction of the picture plane vibration. The area corresponding to the preceding picture plane is extracted from the memory in which the input image has been stored so as to set off the picture plane vibration. Enlarging and interpolating processes are executed and the resultant data is outputted as an output image.

Further, according to "Tracking Area Deciding Method" which has already been filed by the same applicant as the present invention in JP-A-2-117276, a tracking area is automatically judged by accumulating the movement vectors detected every block for a predetermined time, and the optical correcting system (variable vertical angle prism) put in front of the lens system is driven so as to correct the movement vectors detected in such an area, thereby suppressing the picture plane vibration.

The vibrationproof denotes a function to correct the camera vibration. The tracking denotes a function for the camera to trace a moving object. The principle processes and control methods of those functions are equal.

In the above example, however, there is a problem such that an outline of the area to be traced is obscure because of a deterioration in precision of the movement vectors in the boundary area of the area to be traced and the precision of the movement vectors indicative of the picture plane vibration is deteriorated by the movement vectors of low reliabilities which are generated from the block including the outline portion. Even in the case other than the tracking image pickup operation, for instance, when the operator wants to perform the vibrationproof to a background existing in a peripheral portion in the picture plane, when some moving object or motion object exists in the central portion, the above problem occurs in the boundary region of such an object. The causes of such a problem are based on the hiding or appearance of the image in the outline portion of the object to be photographed in association with the movement or motion of the object. In such a case, since there is no guarantee of the correspondence between the front and after images, only the movement vectors of low reliabilities can be obtained.

As another problem, according to the vibrationproof camera disclosed in JP-A-61-248681 as a first example mentioned above, the magnitude and direction of the image vibration are detected by obtaining a correlation between the images which are away from each other by a predetermined time. Therefore, it is desirable to preserve one picture in one image. It is difficult to apply such a technique to the case where a partial motion or modification occurs in the image or the case where the background continuously changes in the tracking photographing mode. Therefore, such a technique can be used in only a limited application field.

According to "Picture Plane Vibration Correcting Apparatus" as a second example mentioned above, on the other hand, since the area (hereinafter, referred to as a vibrationproof area) to be at present subjected to the vibrationproof is determined by a method of decision by majority, in a still image photographing mode such that the operator wants to trace a small object or to perform the vibrationproof to the background, in the case where the object to be photographed is larger than the background portion and the movement vectors of the object are preferably arranged, or the like, the area against the purpose of the photographer is subjected to the vibrationproof.

According to "Tracking Area Deciding Method" as a third example mentioned above, the picture plane is divided into a plurality of areas (blocks) and the movement vectors detected every block are accumulated for a predetermined time, thereby deciding the vibrationproof area. Therefore, such a method is strong even for a partial motion in the image and can realize the vibrationproof at the highest fidelity according to the will of the photographer. There is, however, a case where the accumulation value which is obtained by accumulating the movement vectors detected from the vibrationproof area for a predetermined time is not so enough small. Such a phenomenon occurs, particularly, in the case where the period of time is longer than the accumulation time and the vibration of a low frequency has occurred. In such a case, the division of the vibrationproof area/non-vibrationproof area cannot be correctly performed.

It is the first object of the embodiment is to provide a vibrationproof apparatus which can accurately perform the vibrationproof of an object to be traced and, further, the vibrationproof of the background without being influenced by the moving object or motion object.

The second object of the embodiment is to provide a vibrationproof apparatus which can accurately execute the vibrationproof even under any photographing situation.

According to the embodiment, therefore, the apparatus comprises: boundary detecting means for detecting a boundary in an image; and vibrationproof area deciding means for deciding an area to be subjected to the vibrationproof on the basis of boundary information from the boundary detecting means and information from movement vector detecting means and for instructing the vibrationproof area to vibration amount detecting means, wherein the boundary in a picture plane is detected by a movement vector distribution or a Laplacian arithmetic operation of an input image and the area to be subjected to the vibrationproof is determined by the detected boundary and the movement vector distribution.

On the other hand, the apparatus has vibrationproof area deciding means for applying different weights to the information from the movement vector detecting means, for adding the weighted information for a predetermined time, for deciding the area to be subjected to the vibrationproof on the basis of the addition values, and for instructing the vibrationproof area to the vibration amount detecting means. The vibration area is determined from the magnitudes of the addition values which are obtained by applying different weights to the movement vector information.

(Fourth embodiment)

Figure 11:
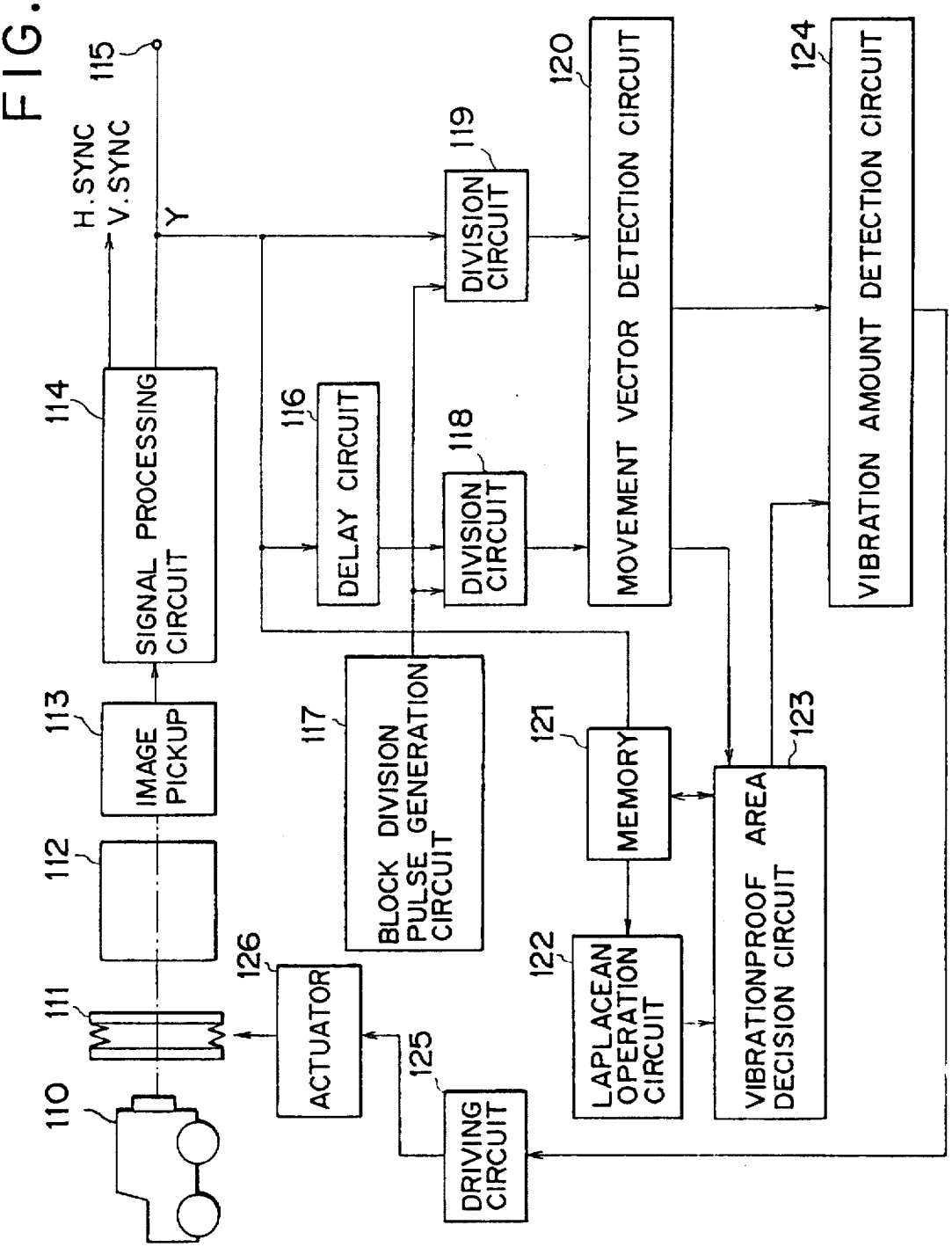
FIG. 11 is a block diagram of a video camera having therein an apparatus of the fourth embodiment according to the present invention.

FIG. 11 is a block diagram showing a video camera having therein a vibrationproof apparatus according to the fourth embodiment of the present invention. In the diagram, reference numeral 110 denotes an object to be photographed; 111 a variable vertical angle prism which can change the optical axis direction; 112 an image pickup lens; 113 an image pickup element comprising, for example, a two-dimensional CCD; and 114 a signal processing circuit to execute a gamma correction, a blanking process, an adding process of a sync signal, and the like to an output image signal from the image pickup element 113. A television signal of, for instance, the NTSC standard is outputted from an output terminal 115. Y denotes a luminance signal. H. SYNC indicates a horizontal sync signal. V. SYNC denotes a vertical sync signal. Reference numeral 116 denotes a delay circuit to delay the luminance signal Y by a predetermined time. For example, the delay circuit 116 is constructed by a field memory of the FIFO (First-in First-out)

type. Reference numeral 117 denotes a block division pulse generation circuit to generate a gate pulse to divide an image signal which is being scanned into predetermined blocks set on a picture plane.

Reference numerals 118 and 119 denote division circuits each for dividing the luminance signal Y in accordance with the output pulses from the block division pulse generation circuit 117. Each of the division circuits 118 and 119 generates the input luminance signal Y in a lump every block set on the picture plane. Practically speaking, each division circuit comprises a gate circuit section whose opening and closing operations are controlled by the output pulse of the generation circuit 117 and a memory section to store a passage signal of the gate circuit section.

Reference numeral 120 denotes a movement vector detection circuit for comparing the signal of the present picture plane and the signal of the picture plane of a predetermined time outputted from the delay circuit 116 and for obtaining the movement vector every divided block. Reference numeral 121 denotes a memory to store the movement vector information in each section on the picture plane and 122 indicates a Laplacian operation circuit to calculate a Laplacian of the movement vector.

Reference numeral 123 denotes a vibrationproof area decision circuit to decide the area to be subjected to the vibrationproof by using the Laplacian of the movement vector which has been calculated in the Laplacian operation circuit 122 as a clue; 124 a vibration amount detection circuit to detect a vibration amount from the luminance signal Y. For instance, the vibration amount detection circuit 124 is constructed by a correlation arithmetic operation circuit to perform a representative point matching or the like or an arithmetic operation circuit of the time space gradient method. Reference numeral 125 denotes a driving circuit to drive an actuator 126, which will be explained hereinlater, in accordance with an output of the vibration amount detection circuit 124. Reference numeral 126 denotes the actuator to change a degree of vertical state for the optical axis of the variable vertical angle prism 111. By changing the vertical angle of the prism 111, the angle of deviation of the outgoing optical axis to the incident optical axis of the prism 111 can be controlled.

In the above construction, the object image which passed through the prism 111 and lens 112 enters the image pickup element 113, by which it is photoelectrically converted into the electric image signal. The image signal is supplied to the signal processing circuit 114 and is subjected to the gamma correction, blanking process, adding process of the sync signal, and the like. The luminance signal Y which is outputted from the signal processing circuit 114 is directly supplied to the division circuit 119. The luminance signal Y is also delayed by the delay circuit 116 by the time of one field period (about 16.7 msec) and is sent to the division circuit 118. Thus, the division circuits 118 and 119 divide the preceding picture plane into "M×N" blocks in accordance with the output pulses of the block division pulse generation circuit 117. The movement vector detection circuit 120 can be constructed by a circuit based on the time space gradient method or a circuit based on the matching arithmetic operation. However, it is necessary to use a circuit construction which can execute the processes in a real-time manner in the embodiment.

The time space gradient method has been described in B. K. P. Horn et al., "Artificial Intelligence 17", pages 185 to 203, 1981. The matching arithmetic operation has been described in Morio Ogami et al., "Information Processing", Vol. 17, No. 17, pages 634 to 640, July, 1976.

The operations from the movement vector detection circuit 120 to the vibrationproof area decision circuit 123 will now be practically explained with reference to FIGS. 12 to 14. A distribution of the movement vectors indicative of a speed field of a whole picture plane is called an optical flow.

Figure 12:
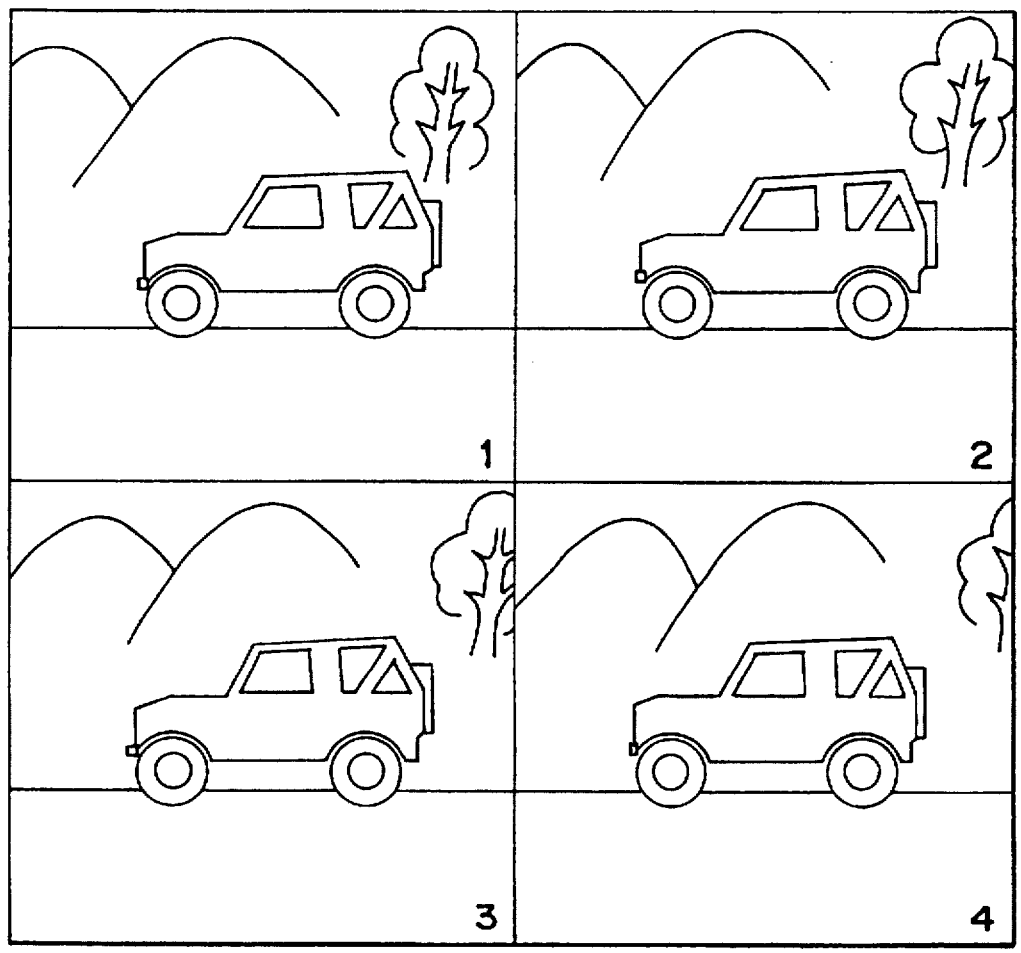
FIG. 12 is a diagram showing an example of a field image which is time-sequentially continuous in a tracking photographing mode.

FIG. 12 shows an example of field picture planes which are time-sequentially continuous when they have been photographed in the tracking mode. FIG. 13 shows an example of an optical flow which is obtained as a result of the arithmetic operation between the two picture planes which are time-sequentially continuous. A movement vector indicative of the vibration occurring during the tracking photographing operation can be observed from a region (1) in the central portion of the picture plane where an object (car) exists. On the other hand, a movement vector in a background portion (2) is obtained by synthesizing the movement vector indicative of a flow of the image in association with the tracking photographing operation and the movement vector due to the vibration.

Figure 13:
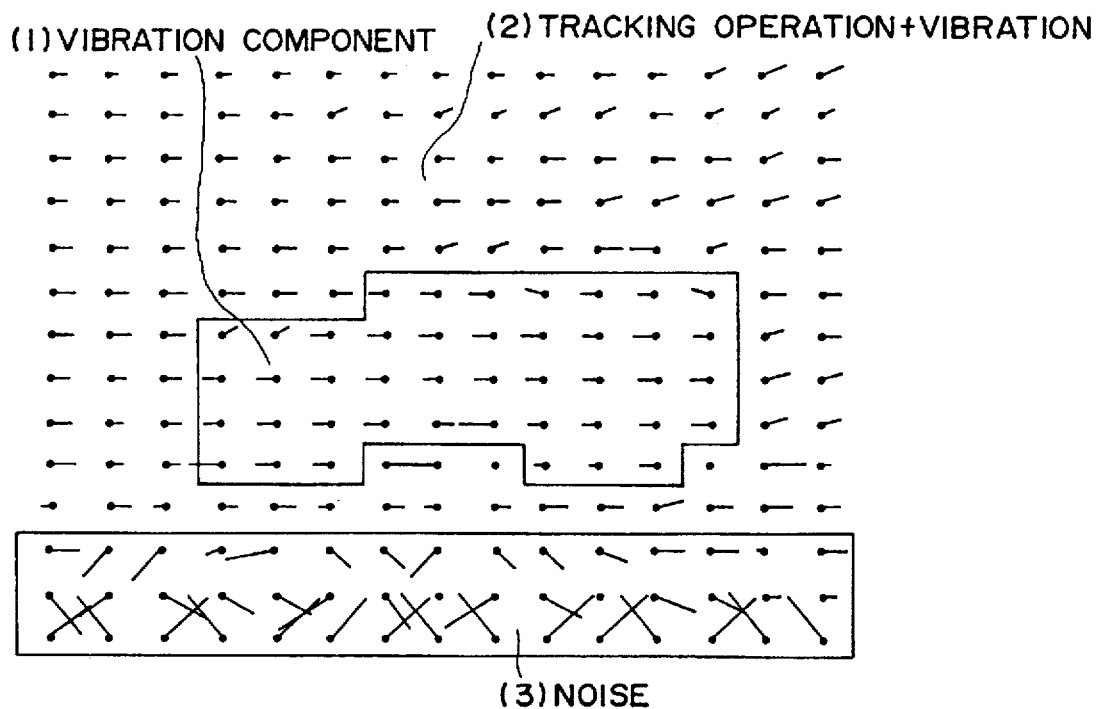
FIG. 13 is an optical flow which is obtained as a result of an arithmetic operation of two picture planes which are time-sequentially continuous.

From only FIG. 13, it is impossible to correctly decide which one of the regions is set to the vibrationproof area. The movement vector in a lower edge portion (3) in FIG. 13 is a vector which has been outputted from a region where enough image information doesn't exist in the input image and the reliability is extremely low and such a vector can be regarded as a noise. When the present invention is put into practical use, the area in which image information lacks needs to be previously eliminated.

Figure 14:
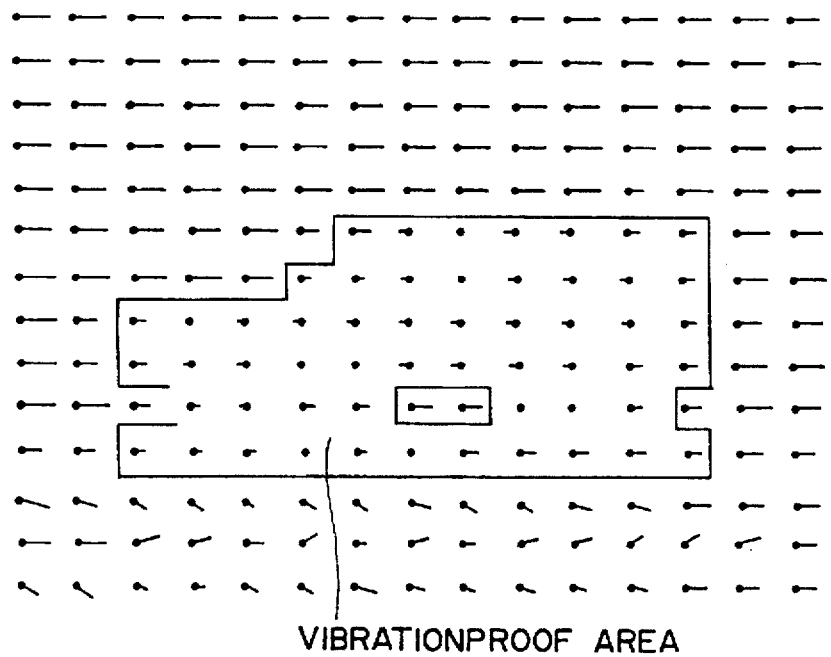
FIG. 14 is a diagram showing the result in the case where the optical flow of FIG. 13 has been added for a predetermined time.

FIG. 14 is a diagram showing an example of the result in which the optical flow as shown in FIG. 13 has been added for a predetermined time (1.3 seconds in this example).

In FIG. 14, a region of an object (car) of a small addition value can be observed in the central portion of the picture plane. In this example, the photographer tries to arrange an object to the central portion of the picture plane. By adding the optical flow for a predetermined time, a target to be photographed now by the photographer can be judged.

This is based on an idea such that "Since the photographer tries to stop the imate in the vibrationproof area, the image in the vibrationproof area swings at random around the position at which the photographer tries to stop the image as a center".

The addition result of the movement vectors detected in the vibrationproof area is converged to a small value because of the random characteristics of the movement vectors. On the other hand, such a state doesn't occur in the non-vibrationproof area, so that the division between the vibrationproof area and the non-vibrationproof area can be performed from the magnitude of the addition value of the movement vectors.

The movement vectors detected by the movement vector detection circuit 120 are accumulated into the memory 121 for a predetermined time. After that, the accumulation value is supplied to the Laplacian operation circuit 122. In the Laplacian operation circuit 122, the Laplacian of the movement vectors detected by the movement vector detection circuit 120 is calculated, thereby obtaining a block of a large change in movement vector. The calculation of the Laplacian is defined by the following equations.

$$\nabla^2 u = \partial^2 u/\partial x^2 + \partial^2 u/\partial y^2$$

$$\nabla^2 v = \partial^2 v/\partial x^2 + \partial_2 v/\partial y^2$$

where, u and v denote speeds in the x direction and y direction.

Since the area in which the result of the Laplacian arithmetic operation is large corresponds to a portion in which the movement vector suddenly changes, the block such that the accurate movement vector cannot be detected can be specified in principle from the magnitude of the result of the Laplacian operation.

In the vibrationproof area decision circuit 123, the vibrationproof area to which the photographer wants to perform the vibrationproof at present is accurately decided from the distribution of the result of the Laplacian arithmetic operation. The vibrationproof area is first coarsely determined from the distribution of the addition values of the movement vectors which are detected for the whole area of the picture plane for a predetermined time. Further, the area in which the accurate movement vectors were detected is selected from the result of the Laplacian operation. In the vibration amount detection circuit 124, the movement vectors in the area decided by the vibrationproof area decision circuit 123 is calculated. Specifically speaking, among the movement vectors detected by the movement vector detection circuit 120, the average of the movement vectors which are outputted from the block corresponding to the vibrationproof area can be also obtained. Or, the movement vectors can be also again newly accurately detected in the vibrationproof area. The vibration amount detected by the vibration amount detection circuit 124, namely, the picture plane vibration amount is supplied to the driving circuit 125. The actuator 126 is driven by the driving circuit 125 and a proper angle of deviation is given to the prism 111 and the vibration amount is optically corrected.

(Fifth embodiment)

According to the above first embodiment, the Laplacian of the optical flow has been calculated to decide the vibrationproof area. However, the Laplacian of the input image itself can be also calculated and such a case will now be described hereinbelow as a fifth embodiment.

Figure 15:
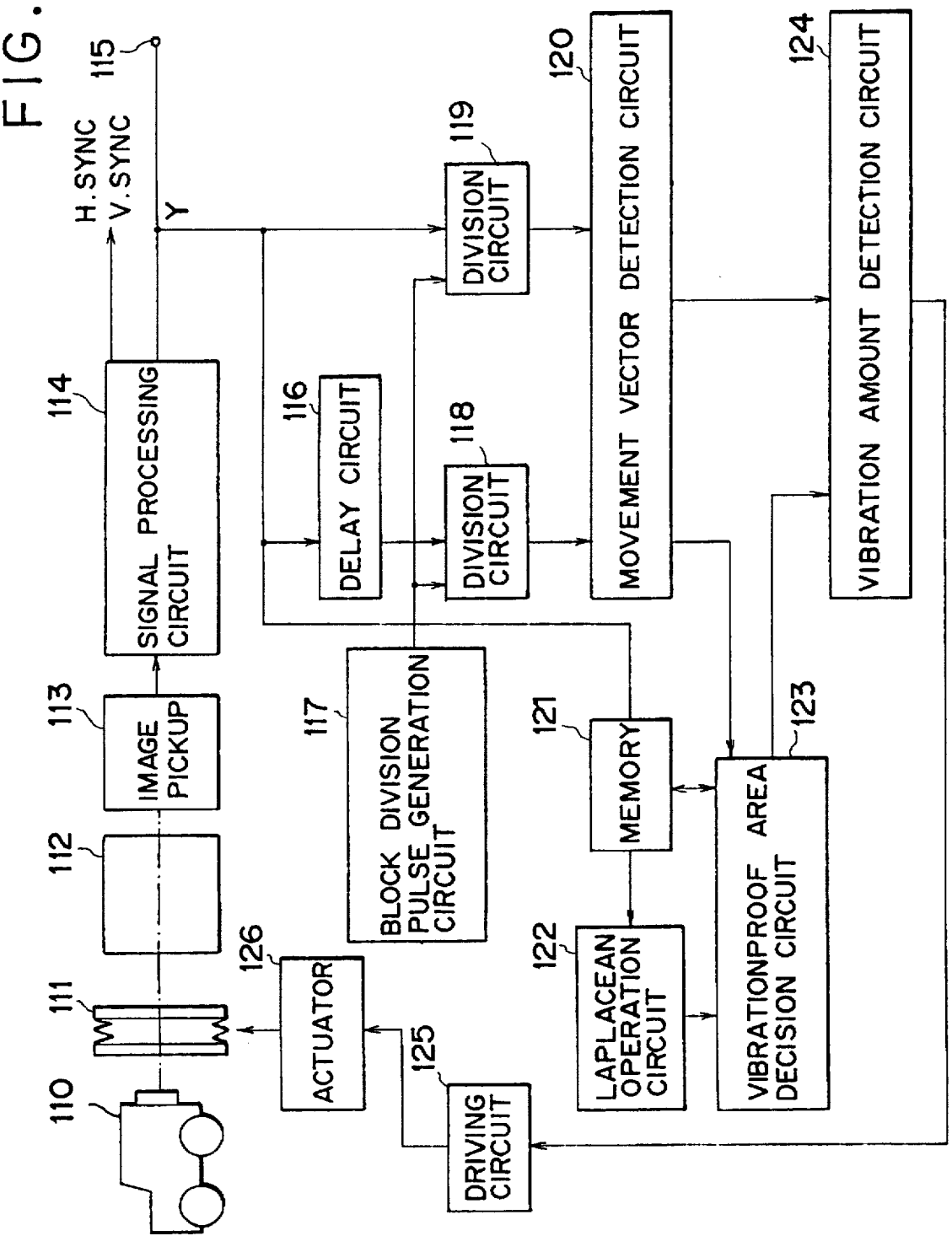
FIG. 15 is a block diagram of a video camera having therein an apparatus of the fifth embodiment according to the present invention.

FIG. 15 is a block diagram of a video camera having therein a vibrationproof apparatus according to the fifth embodiment of the present invention.

FIG. 15 differs from FIG. 11 with respect to a point that the image signal (luminance signal Y) from the signal processing circuit 114 is supplied to the memory 121 in place of the signal from the movement vector detection circuit 120.

The input image is once stored in the memory 121 and the Laplacian operation is executed to the input image by the Laplacian operation circuit 122.

Effects of the Laplacian will now be described with reference to FIGS. 16 to 18.

Figure 16:
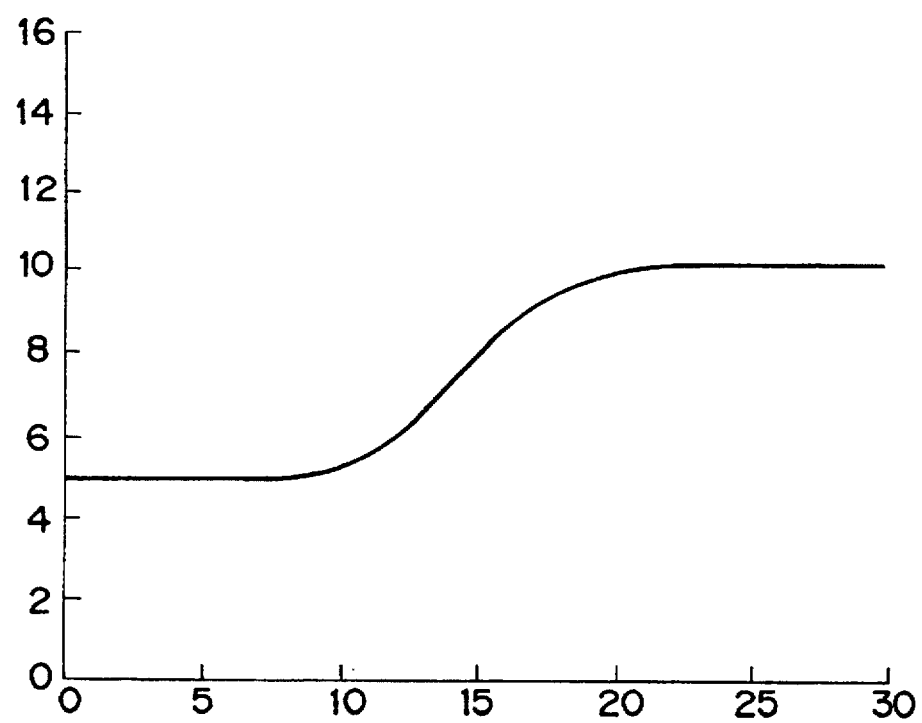
FIG. 16 is a model diagram of an edge existing in an image.
Figure 17:
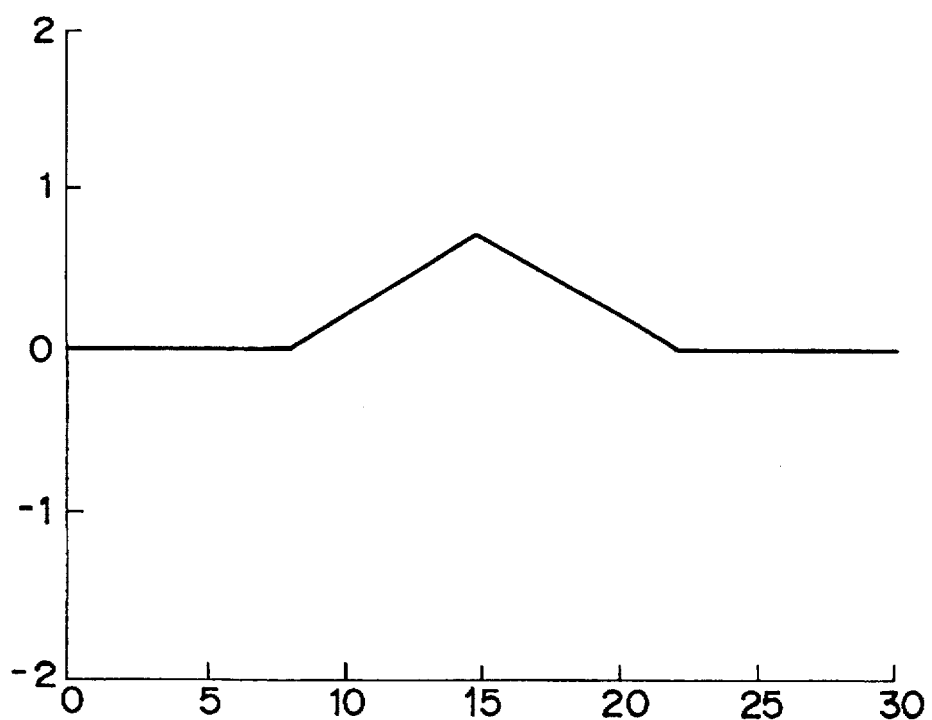
FIG. 17 is a diagram showing a waveform when the edge of FIG. 16 has been subjected to a first order differentiation.

FIG. 16 is a model diagram of an edge existing in the image. FIG. 17 is a diagram showing the result in which the edge of FIG. 16 has been first order differentiated. FIG. 18 is a diagram showing the result in which the result of FIG. 17 has further been first order differentiated. Therefore, FIG. 18 shows the result of the second order differentiation in FIG. 16, that is, the Laplacian.

Figure 18:
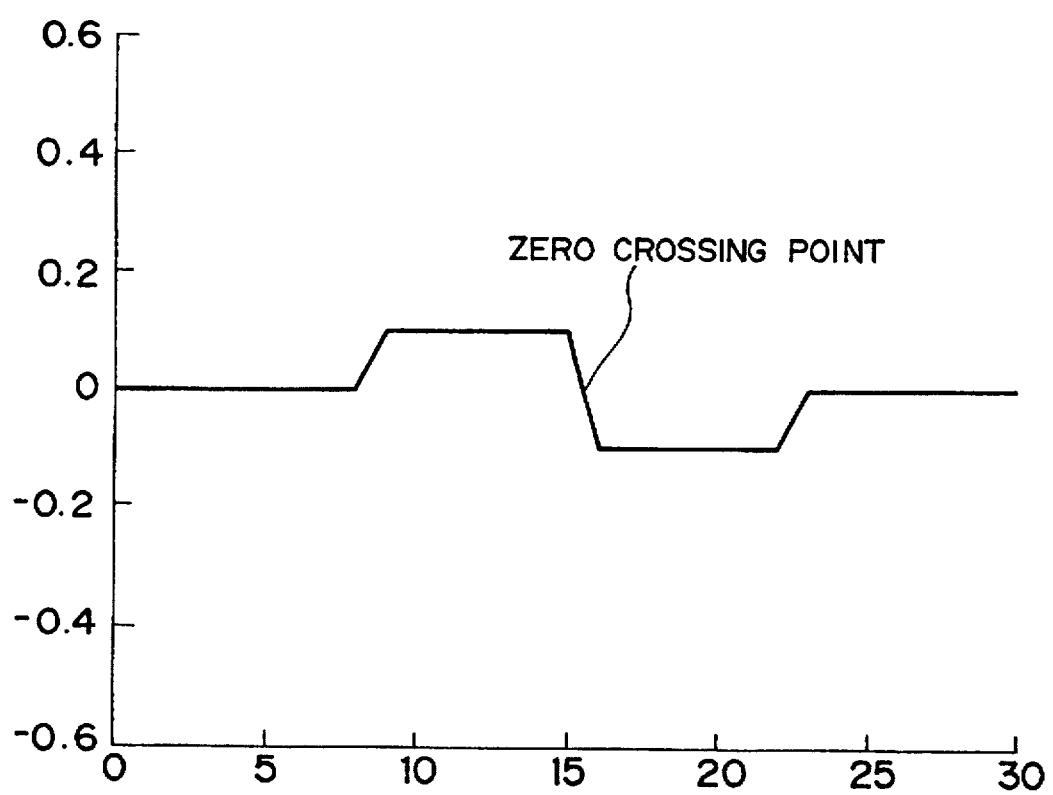
FIG. 18 is a diagram showing a waveform when the edge of FIG. 16 has been subjected to a second order differentiation.

A zero intersection point shown in FIG. 18 is generally called a zero crossing point and shows an edge portion of the image. The edge corresponds to the location at which the hiding or appearance of the image mentioned in the foregoing first embodiment occurs.

In the Laplacian operation circuit 122, the Laplacian of an image is calculated. In the vibrationproof area decision circuit 123, the block including the zero crossing point is found out from the result of the output of the Laplacian operation circuit 122 and the movement vectors detected by the movement vector detection circuit 120 and is set into a non-vibrationproof area. The other areas are determined as a vibrationproof area. In the vibration amount detection circuit 124, the movement vectors in the area decided by the vibrationproof area decision circuit 123 is calculated in a manner similar to the first embodiment. Specifically speaking, among the movement vectors detected by the movement vector detection circuit 120, the average of the movement vectors which are outputted from the block corresponding to the vibrationproof area can be also obtained or the movement vectors can be also again newly accurately detected in the vibrationproof area. The vibration amount detected by the vibration amount detection circuit 124, namely, the picture plane vibration amount is supplied to the driving circuit 125. The actuator 126 is driven by the driving circuit 125. A proper angle of deviation is given to the prism 111 and the vibration amount is optically corrected.

According to the above fourth and fifth embodiments, the boundary of the vibrationproof area that is presumed from the distribution of the addition values of the movement vectors or the distribution of the addition values of the input image can be clarified by a simple arithmetic operation. Thus, the vibrationproof can be performed to the background portion without being influenced by the moving object or motion object. On the contrary, the vibrationproof of an object to be traced can be also similarly stably performed. The method of deciding the vibrationproof area mentioned above can be widely applied to not only the TV camera for photographing but also an industrial TV camera, monitoring camera, or the like. There is practically a remarkable advantage.

(Sixth embodiment)

Figure 19:
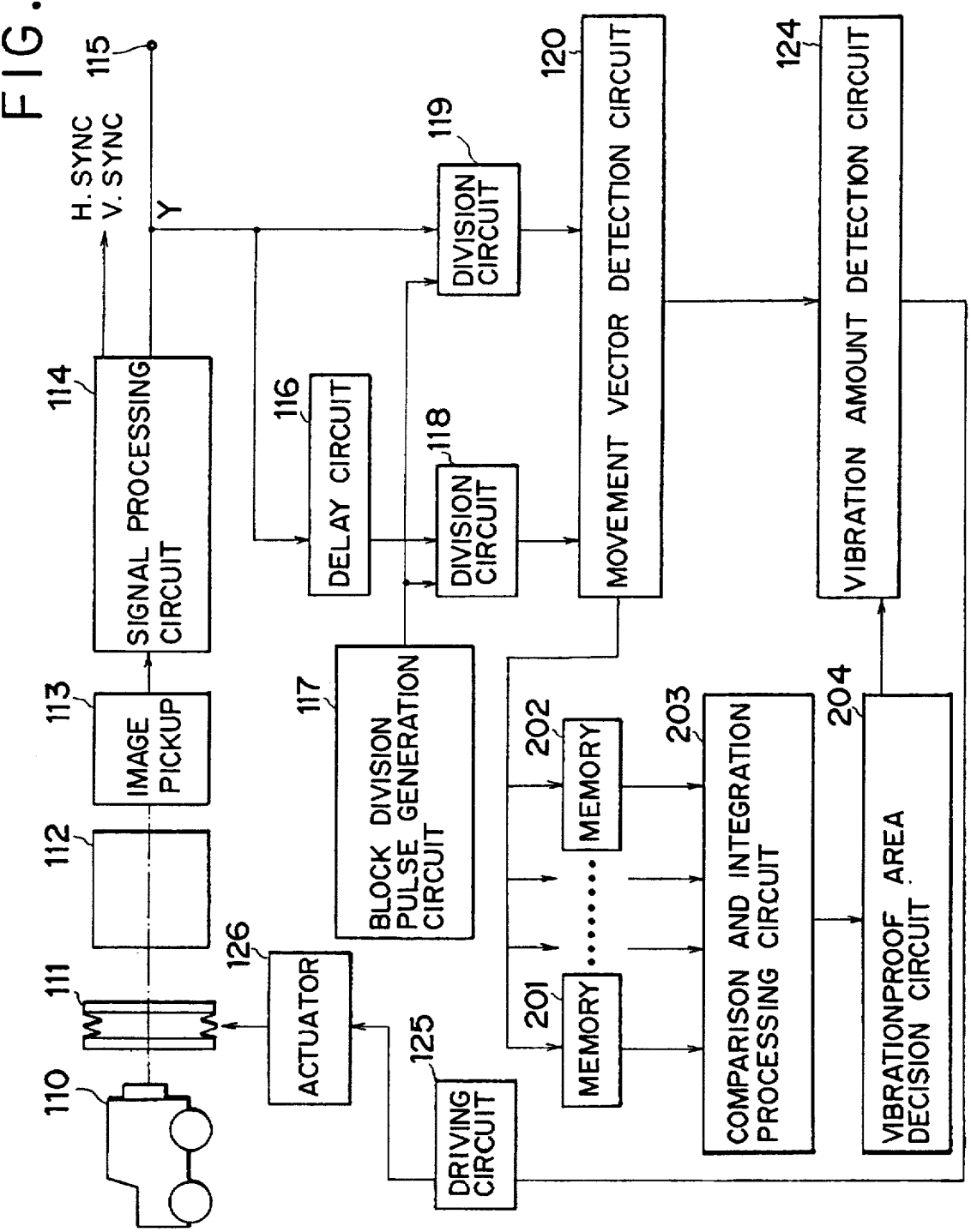
FIG. 19 is a block diagram of a video camera having therein an apparatus of the sixth embodiment according to the present invention.

FIG. 19 is a block diagram of a video camera having therein a vibrationproof apparatus according to the sixth embodiment of the present invention. In FIG. 19, the same portions as those in FIG. 11 are designated by the same reference numerals.

In FIG. 19, reference numerals 201 and 202 denote memories. Proper weights are applied to the movement vectors in each portion on the picture plane detected by the movement vector detection circuit 120 and the resultant weighted values are accumulated and stored into those memories. Reference numeral 203 denotes a comparison and integration processing circuit to compare and integrated various weight addition values of the movement vectors. Reference numeral 204 indicates a vibrationproof area decision circuit to decide the vibrationproof area from an output of the comparison and integration processing circuit 138 and an output of the movement vector detection circuit 120.

The operation in the above construction will now be described.

The object image which passed through the prism 111 and the lens 112 enters the image pickup element 113, by which it is photoelectrically converted into the electric image signal. The image signal is supplied to the signal processing circuit 114 and is subjected to processes such as gamma correction, blanking process, adding process of a sync signal, and the like. The luminance signal Y which is outputted from the signal processing circuit 114 is directly supplied to the division circuit 119. The luminance signal Y is also delayed by the delay circuit 116 by the time of one field period (about 16.7 msec) and the delayed signal is supplied to the division circuit 118. The division circuits 118 and 119 divide the preceding picture plane into "M×N" blocks in accordance with output pulses from the block division pulse generation circuit 117. The movement vector detection circuit 120 can be constructed by the circuit based on the time space gradient method or the circuit based on the matching arithmetic operation. However, it is necessary to use a circuit construction which can execute the processes in a real-time manner in the embodiment.

The operations from the movement vector detection circuit 120 to the vibrationproof area decision circuit 123 will be further described with reference to FIGS. 12 to 14 again.

FIG. 12 is a diagram showing an example of field picture planes which are time-sequentially continuous when they have been photographed in the tracking mode. FIG. 13 shows an example of an optical flow which is obtained as a result of the arithmetic operation between the two picture planes which are time-sequentially continuous. The movement vectors indicative of the vibration occurring during the tracking photographing operation can be observed from the region (1) in the central portion of the picture plane where the object (car) exists. On the other hand, the movement vectors in the background portion (2) are obtained by synthesizing the movement vectors indicative of the flow of the image in association with the tracking photographing operation and the movement vectors due to the vibration.

From only FIG. 13, it is impossible to correctly decide which one of the regions is a vibrationproof area. The movement vectors in the lower edge portion (3) in FIG. 13 are vectors outputted from the area in which there is no enough image information in the input image and the reliabilities are extremely low, so that those movement vectors can be regarded as a noise. When the invention is put into practical use, the area in which image information lacks needs to be previously eliminated.

FIG. 14 is a diagram showing an example of the result in which the optical flow as shown in FIG. 13 was added for a predetermined time (1.3 seconds here).

In FIG. 14, the area of the object (car) of a small addition value can be observed in the central portion of the picture plane. In the example, the photographer tries to arrange the object to be photographed to the central portion of the picture plane. By adding the optical flow for a predetermined time, it is possible to judge a target which the photographer tries to photograph at present.

Such a method is based on the idea such that "Since the photographer tries to stop the image in the vibrationproof area, the image in the vibrationproof area swings at random around the position at which the photographer tries to stop the image as a center".

The addition result of the movement vectors detected in the vibrationproof area is converged to a small value because of the random characteristics of the movement vectors. On the other hand, such a conversion doesn't occur in the non-vibrationproof area. Thus, the vibrationproof area and the non-vibrationproof area can be divided from the magnitude of the addition value of the movement vectors.

The movement vectors detected by the movement vector detection circuit 120 are accumulated into the memories 201 and 202 for a predetermined time. After that, they are supplied to the comparison and integration processing circuit 203.

The operations of the memories 201 and 202 will now be described in detail with reference to FIGS. 20 and 21.

FIG. 20 shows the addition result when a vibration state has been modeled by a cosine curve of an amplitude "1" and the modeled values have been added for a predetermined time (T), namely, a magnitude of the remaining component. An axis of ordinate indicates a remaining component amount which has been standardized for the accumulation time T. An axis of abscissa indicates a vibration frequency.

In FIG. 20, a solid line ① shows a remaining component when the movement vectors have been added by a uniform weight for a predetermined time. A broken line ② indicates a remaining component when a weight function which is convex in the upward direction and whose weight is large as a time point is close to the present time has been multiplied to the movement vectors and the resultant movement vectors have been added. A short broken line ③ shows a remaining component when the movement vectors have been added by using a weight function whose weight increases at regular intervals as a time point is close to the present time. A long broken line ④ shows a remaining component when the movement vectors have been added by using a weight function which is convex in the upward direction and whose weight is large as a time point is close to the present time.

FIG. 21 shows a magnitude of a remaining component when a vibration state has been modeled by a sine curve of an amplitude "1" and the modeled values have been added for a predetermined time (T). The contents of FIG. 21 will be understood in a manner similar to FIG. 20.

FIG. 20 shows the case where the DC component exists and corresponds to the panning operation or the operation in the tracking photographing mode. On the other hand, FIG. 21 shows the case where no DC component exists and corresponds to the operation in the still photographing mode (state in which the photographer sets the camera main body into a still state and tries to photograph). It will be obviously understood from FIGS. 20 and 21 that in a region of a high vibration frequency, there is not so large difference between the methods of applying weights and that, on the contrary, in a region of a low vibration frequency, a large difference occurs in the appearance of the remaining component in dependence on the method of applying the weight.

The memories 201 and 202 are memories to realize, for example, four kinds of weight adding methods as shown in FIGS. 20 and 21 and have elated photographing modes. That is, in those diagrams, in case of adding by a uniform load (weight) as shown by the solid line ①, there is a large difference between the time addition value of the movement vectors due to the vibration of a low frequency and the time addition value of the movement vectors by the vibration of a high frequency, so that the area division in a photographing situation in which the DC component exists is elated. On the contrary, in case of adding by using the load which becomes significant in an exponential function manner as the data is close to the latest data as shown by the long broken line ④, the time addition value of the movement vectors by vibrations of almost all of the frequencies is set to a small value and a still photographing situation having no DC component is elated.

However, since the photographing state cannot previously been known, in the comparison and integration processing circuit 203, the time addition values (namely, remaining components) of the movement vectors outputted from the memories 201 and 202 to accumulate the movement vectors with different weights are compared and integrated, thereby first presuming the present photographing situation. Subsequently, for instance, in the case where it is presumed that the present photographing situation is a tracking photographing state, a more significance is paid to the weight addition result shown by the solid line ① in FIGS. 20 and 21 and the addition result is outputted. On the contrary, in the case where it is presumed that the present state is the still photographing state, a more significance is paid to the weight addition result shown by the long broken line ④ in FIGS. 20 and 21 and the addition result is outputted. Or, the memory which adaptively outputs in accordance with the photographing situation can be also switched. In the case where the photographing state cannot be classified to any one of those situations, the average between the states shown by the solid line ① and long broken line ④ in FIGS. 20 and 21 can be also set. The intermediate weight addition as shown by the broken line ② and short broken line ③ in FIGS. 20 and 21 can be also performed.

In the vibrationproof area decision circuit 204, the vibrationproof area is accurately decided from the magnitude relation of the addition values of the movement vectors which are outputted from the comparison and integration processing circuit 203. In the vibration amount detection circuit 124, the movement vectors in the area decided by the vibration area decision circuit 204 are arithmetically operated. Practically speaking, among the movement vectors detected by the movement vector detection circuit 120, the average of the movement vectors which are outputted from the block corresponding to the vibrationproof area can be also used. Or, the movement vectors can be also again newly accurately detected in the vibrationproof area. The vibration amount detected by the vibration amount detection circuit 124, namely, the picture plane vibration amount is supplied to the driving circuit 125 in a manner similar to that mentioned above. The actuator 126 is driven by the driving circuit 125. A proper angle of deviation is added to the prism 111 and the vibration amount is optically corrected.

According to the sixth embodiment, by providing a plurality of memories to apply different weights to the movement vectors and to accumulate and add the weighted movement vectors, the vibrationproof area can be accurately decided in every photographing situation. In the embodiment as well, the vibrationproof area deciding method can be widely applied to not only the photographing TV camera but also the industrial TV camera, monitoring camera, or the like. There is a remarkable advantage in the practical use.

As described above, according to each of the above embodiments, the apparatus comprises: the boundary detecting means for detecting a boundary in an image; and the vibrationproof area deciding means for deciding the area to be subjected to the vibrationproof on the basis of the boundary information from the boundary detecting means and the information from the movement vector detecting means and for instructing the vibrationproof area to the vibration amount detecting means, wherein the boundary in the picture plane is detected by the movement vector distribution or the Laplacian arithmetic operation of the input image. The area to be subjected to the vibrationproof is determined by the detected boundary and the movement vector distribution.

Therefore, the vibrationproof of the object to be traced, further, the vibrationproof of the background can be accurately performed without being influenced by the moving object or motion object.

On the other hand, the apparatus has the vibrationproof area deciding means for applying different weights to the information from the movement vector detecting means, for adding the weighted information for a predetermined time, for deciding the area to be subjected to the vibrationproof on the basis of the addition values, and for instructing the vibrationproof area to the vibration amount detecting means. The vibrationproof area is decided from the magnitudes of the addition values which are obtained by multiplying different weights to the movement vector information. Consequently, the accurate vibrationproof can be executed under every photographing situation.

What is claimed is:

1. A movement vector detecting apparatus comprising:
a) movement vector detecting means for dividing an input image into a plurality of blocks and for detecting movement vectors in every one of the blocks; and
b) movement vector calculating means for detecting an effective area including effective blocks on the basis of a distribution of the movement vectors of the plurality of blocks and for calculating a representative movement vector in the effective area by
(i) calculating and assigning different weighting values for the movement vectors of the effective blocks according to the position of each effective block within the effective area, and
(ii) averaging the weighted movement vectors.

2. An apparatus according to claim 1, further having image pickup means for photoelectrically converting an object image formed on an image pickup surface and for outputting an image pickup signal.

3. An apparatus according to claim 2, wherein said input image is an image formed on the image pickup surface of said image pickup means, and said movement vector detecting means detects the movement vectors from the image pickup signal.

4. An apparatus according to claim 3, wherein said movement vector detecting means obtains the movement vectors from a luminance signal which is obtained by eliminating a color signal component from the image pickup signal.

5. An apparatus according to claim 1, wherein said movement vector detecting means generates a distribution (optical flow) of the movement vectors on a picture plane.

6. An apparatus according to claim 1, wherein said movement vector calculating means detects the blocks which output the movement vectors due to a vibration as a target for correction from said optical flow and applies weights according to a degree of surrounding of said blocks to output signals from said blocks and calculates a movement amount of the image at that moment in a real-time manner.

7. An apparatus according to claim 1, wherein said movement vector calculating means detects the blocks which output the movement vectors due to a vibration as the target for correction from said optical flow and executes a convolution mask arithmetic operation to the output signals from said blocks, thereby applying the weights to said signals.

8. An apparatus according to claim 7, wherein the convolution mask arithmetic operation is executed in a manner such that in the case where blocks which are adjacent to the target blocks in vertical and lateral directions exist, a point 1 is given to the target blocks, and in the case where blocks which are adjacent in oblique directions exist, a point 0.5 is given so that a higher point total is provided to target blocks surrounded by more adjacent blocks, and the weight of the movement vector is increased for target blocks of a high point total.

9. An apparatus according to claim 8, wherein said movement vector calculating means is constructed by a microcomputer.

10. An apparatus according to claim 1, further comprising correcting means for correcting a vibration on the basis of an output of the movement vector calculating means.

11. An apparatus according to claim 10, wherein said correcting means variably changes a read-out position when image information is read out from an image memory on the basis of the output of said movement vector calculating means, thereby setting off the vibration.

12. A movement vector detecting apparatus comprising:
a) movement vector detecting means for dividing an input image into a plurality of blocks and for detecting movement vectors in every one of the blocks; and b) movement vector calculating means for detecting an effective area including effective blocks on the basis of a distribution of the movement vectors of the plurality of blocks and for calculating a representative movement vector in the input image in the effective area by
   (i) calculating and assigning different weighting values for the movement vectors of the effective blocks according to the position of each effective block within the effective area, and
   (ii) averaging the weighted movement vectors.

13. An apparatus according to claim 12, wherein said movement vector detecting means generates a distribution (optical flow) of the movement vectors on a picture plane and extracts the blocks which output the movement vectors due to a vibration as a target for correction from said optical flow and performs a weighing process according to a degree of surrounding of said blocks to output signals from said blocks, thereby calculating a movement amount of the image at that moment in a real-time manner.

14. An apparatus according to claim 13, wherein said movement vector calculating means detects the blocks which output the movement vectors due to the vibration serving as the target for correction from said optical flow and executes a convolution mask arithmetic operation to the output signals from said blocks, thereby applying a weight.

15. An apparatus according to claim 12, further having correcting means for correcting a vibration on the basis of an output of said movement vector calculating means.

16. An apparatus according to claim 15, wherein said correcting means includes an image memory and variably changes a read-out position when image information is read out from said image memory on the basis of an output of said movement vector calculating means, thereby setting off the vibration.

17. A movement vector detecting apparatus comprising:
   a) movement vector detecting means for dividing an input image into a plurality of blocks and for detecting movement vectors in every one of the blocks;
   b) movement vector calculating means for extracting effective areas including effective blocks on the basis of a distribution of the movement vectors from said movement vector detecting means and for calculating representative movement vector values for each of the effective areas by
      (i) calculating and assigning different weighting values for the movement vectors of the effective blocks in each effective area according to the position of each effective block within the respective effective area, and
      (ii) averaging the weighted movement vectors of each effective area; and
   c) evaluating means for evaluating the representative movement vectors for the effective areas calculated by said movement vector calculating means on the basis of the total number of weight coefficients due to the weight averaging process.

18. An apparatus according to claim 17, wherein said movement vector detecting means generates a distribution (optical flow) of the movement vectors on a picture plane and extracts the blocks which output the movement vectors due to a vibration serving as a target for correction from said optical flow and executes a convolution mask arithmetic operation to output signals from said blocks, thereby applying a weight.

19. An apparatus according to claim 18, wherein said convolution mask arithmetic operation is executed in a manner such that in the case where blocks adjacent to the target blocks in vertical and lateral directions exist, a point 1 is given to said target blocks, and in the case where blocks adjacent in oblique directions exist, a point 0.5 is given, thereby raising a point total as the number of adjacent blocks which surround the target blocks is large, and the weight of the movement vector is increased as the point total of the blocks is increased.

20. An apparatus according to claim 19, wherein said evaluating means has a predetermined evaluation function, and when the point total is small, there is a possibility of an erroneous detection, so that the weight is multiplied by a small coefficient less than 1, thereby reducing an influence.

21. An apparatus according to claim 20, wherein assuming that the number of blocks in the picture plane is set to M×N, where M is a number of blocks in a row direction and N is a number of blocks in a column direction, said evaluating means expresses a point distribution by $0 \leq$ total number of points $\leq 7$ Mn$-$4M$-$4N$+$2.

22. An apparatus according to claim 17, wherein said evaluating means evaluates a reliability of each block by calculating a correlation among picture planes which differ with respect to a time for a weight coefficient distribution in the effective blocks.

23. A vibrationproof apparatus comprising:
   a) movement vector detecting means for detecting movement vectors of an image in every area obtained by dividing the image into a plurality of areas;
   b) first detecting means for detecting an effective vibration detecting area according to vibration amounts and a distribution of the movement vectors on the basis of movement vector information in each of the plurality of areas from said movement vector detecting means;
   c) boundary detecting means for detecting a boundary of the image;
   d) second detecting means for modifying an effective vibration detecting area detected by said first detecting means on the basis of an output of said boundary detecting means and an output of said movement vector detecting means; and
   e) correcting means for correcting a vibration in accordance with the information from said second detecting means.

24. An apparatus according to claim 23, further comprising image pickup means for photoelectrically converting an object image formed on an image pickup surface and for outputting an image pickup signal.

25. An apparatus according to claim 24, wherein said input image is an image formed on the image pickup surface of said image pickup means, and said movement vector detecting means detects the movement vectors from a luminance signal in the image pickup signal.

26. An apparatus according to claim 23, wherein said movement vector detecting means generates a distribution (optical flow) of the movement vectors on a picture plane.

27. An apparatus according to claim 26, wherein said second detecting means discriminates an area in which a main object to be photographed exists by adding said optical flow for a predetermined time.

28. An apparatus according to claim 27, wherein said boundary detecting means detects a boundary of the image on the basis of the result of a Laplacian arithmetic operation of the movement vector distribution.

29. An apparatus according to claim 28, wherein said boundary detecting means specifies the block in which the movement vectors cannot correctly be detected from the magnitude of the result of the Laplacian arithmetic operation of the movement vector distribution.

30. An apparatus according to claim 29, wherein said second detecting means decides a coarse vibration detecting area from a distribution of the result in which the optical flow has been added for a predetermined time, and further an area in which accurate movement vectors can be detected is selected from the result of the Laplacian arithmetic operation.

31. An apparatus according to claim 30, further having correcting means for correcting a vibration on the basis of an output of said vibration amount detecting means.

32. An apparatus according to claim 31, wherein said correcting means is a variable vertical angle prism.

33. An apparatus according to claim 23, wherein said boundary detecting means detects a boundary of the image from the result of the Laplacian arithmetic operation of the input image.

34. An apparatus according to claim 33, wherein said boundary detecting means detects a zero crossing point indicative of an edge portion of the image as a result of the Laplacian arithmetic operation of the input image, and said second detecting means sets the block including said zero crossing point into a non-vibration area which is not used for vibration detection and sets the other blocks into the vibration detecting areas.

35. A vibrationproof apparatus comprising:

a) movement vector detecting means for detecting movement vectors in every area which is obtained by dividing an image into a plurality of areas;

b) vibration detecting area deciding means (i) for assigning different weights to the movement vectors from said movement vector detecting means according to a plurality of weighting functions, (ii) for integrating the weighted movement vectors in each of the plurality of areas for a predetermined time, and (iii) for deciding the vibration detecting area on the basis of the integrated values;

c) vibration amount detecting means for detecting a vibration amount of the basis of the movement vector information in said vibration detecting area; and d) correcting means for correcting a vibration in accordance with information from said vibration amount detecting means.

36. An apparatus according to claim 35, further having image pickup means for photoelectrically converting an object image formed on an image pickup surface and for outputting an image pickup signal.

37. An apparatus according to claim 36, wherein said input image is an image formed on the image pickup surface of said image pickup means, and said movement vector detecting means detects the movement vectors from said image pickup signal.

38. An apparatus according to claim 35, wherein said movement vector detecting means generates a distribution (optical flow) of the movement vectors on a picture plane.

39. An apparatus according to claim 38, wherein said vibration detecting area deciding means decides the vibration detecting area on the basis of a movement vector distribution as a result in which said optical flow has been added for a predetermined time.

40. An apparatus according to claim 38, further comprising a plurality of memory means for applying different weights to the information from said movement vector detecting means and for accumulating the weighted information.

41. An apparatus according to claim 40, wherein the movement vector weight addition information which is accumulated in said memory means is movement vector information corresponding to different photographing states.

42. An apparatus according to claim 41, wherein said different photographing states include a panning operation, an object tracking photographing operation, a still photographing operation (camera is fixed), and the like.

43. An apparatus according to claim 41, further comprising comparing and integrating means for comparing and integrating the different weight addition values of the movement vectors stored in said memory means, for detecting the present photographing state, for giving significance to the weight addition value in the memory means corresponding to said present photographing state, and for outputting the weight addition value.

44. An apparatus according to claim 43, wherein said vibration detecting area deciding means decides the vibration detecting area from the magnitudes of the movement vectors outputted from said comparing and integrating means.

45. A video camera apparatus comprising:

a) image pickup means for photoelectrically converting an object image formed on an image pickup surface and for outputting an image pickup signal;

b) movement vector detecting means for detecting movement vectors from said image pickup signal for every block obtained by dividing said image pickup surface into a plurality of blocks;

c) operating means for assigning different weights to the movement vectors output from said movement vector detecting means according to a plurality of weighting functions and for integrating the weighted movement vectors in each of the plurality of blocks for a predetermined time;

d) memory means for storing the integrated information;

e) vibration detecting area deciding means for deciding a vibration detecting area by evaluating integrated weight values stored in said memory means;

f) vibration amount detecting means for detecting a vibration amount on the basis of movement vector information in the vibration detecting area from said movement vector detecting means; and g) correcting means for correcting a vibration in accordance with the information from said vibration amount detecting means.

* * * * *

UNITED STATES PATENT AND TRADEMARK OFFICE
CERTIFICATE OF CORRECTION

PATENT NO. : 5,731,849
DATED : March 24, 1998
INVENTOR(S) : KONDO TOSHIAKI, ET AL.

It is certified that error appears in the above-indentified patent and that said Letters Patent is hereby corrected as shown below:

Column 10

Line 14, "so enough" should read --sufficiently--.
    Line 19, "is" 2nd occur. should be deleted.

Column 12

Line 39, "imate" should read --image--.

Column 15

Line 23, "no" should read --not--.

Column 16

Line 48, "cannot" should read --cannot have--.

Column 20

Line 17, "7 Mn" should read --7MN--.

Signed and Sealed this

Fifteenth Day of September, 1998

Attest:

BRUCE LEHMAN

*Attesting Officer*    *Commissioner of Patents and Trademarks*